United States Patent
Sizikov

(10) Patent No.: US 10,177,563 B1
(45) Date of Patent: *Jan. 8, 2019

(54) ADJUSTING OVER CURRENT PROTECTION VALUES DURING CHANGES IN LOAD CURRENT

(71) Applicant: GOOGLE LLC, Mountain View, CA (US)

(72) Inventor: Gregory Sizikov, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/487,939

(22) Filed: Apr. 14, 2017

Related U.S. Application Data

(63) Continuation of application No. 14/532,702, filed on Nov. 4, 2014, now Pat. No. 9,667,060.

(51) Int. Cl.
*H02H 3/08* (2006.01)
*H02H 9/02* (2006.01)

(52) U.S. Cl.
CPC .................... *H02H 9/02* (2013.01)

(58) Field of Classification Search
None
See application file for complete search history.

(56) References Cited

U.S. PATENT DOCUMENTS

| | | | |
|---|---|---|---|
| 4,345,292 A | 8/1982 | Jaeschke | |
| 4,597,025 A | 6/1986 | Rutchik | |
| 5,170,311 A | 12/1992 | Zulaski et al. | |
| 5,244,006 A | 9/1993 | Pettesch | |
| 7,265,959 B2 | 9/2007 | Guo | |
| 8,737,024 B2 | 5/2014 | Nanov | |
| 9,667,060 B1 * | 5/2017 | Sizikov | .................... H02H 9/02 |
| 9,966,206 B1 * | 5/2018 | Sastry | ...................... H01H 9/54 |
| 2008/0285192 A1 | 11/2008 | Phadke | |
| 2010/0097731 A1 * | 4/2010 | Franke | .................. H02H 3/006 361/29 |
| 2012/0098517 A1 | 4/2012 | Esumi | |

(Continued)

OTHER PUBLICATIONS

Intersil, "Two-Phase Buck PWM Controller with Integrated MOSFET Drivers for Intel VR11 and AMD Applications," Sep. 2, 2008, pp. 1-33.

(Continued)

*Primary Examiner* — Ronald W Leja
(74) *Attorney, Agent, or Firm* — Fish & Richardson P.C.

(57) ABSTRACT

The systems and methods described are for adjusting over current protection values during changes in load current. In one aspect, a method includes, monitoring a load current amplitude value at a power input connected to an electrical load; determining a rate of change of the load current amplitude value; determining whether the rate of change of the load current amplitude value exceeds a predefined rate threshold value; in response to determining that the rate of change of the load current amplitude value exceeds the predefined rate threshold value: adjusting an over current protection value from a first over current protection value to an adjusted over current protection value for a first predefined amount of time; and at the expiration of the first predefined amount of time, at least partially reversing the adjustment to the over current protection value.

16 Claims, 3 Drawing Sheets

(56) References Cited

U.S. PATENT DOCUMENTS

| | | | |
|---|---|---|---|
| 2012/0116696 A1* | 5/2012 | Wank | G01R 31/42 |
| | | | 702/58 |
| 2012/0280645 A1* | 11/2012 | Olsson | H02P 23/0077 |
| | | | 318/802 |
| 2013/0278224 A1 | 10/2013 | Ofek | |
| 2013/0321966 A1 | 12/2013 | Syngaevskiy | |
| 2013/0331994 A1* | 12/2013 | Ng | B25B 23/147 |
| | | | 700/275 |
| 2014/0253102 A1 | 9/2014 | Wood | |
| 2014/0268461 A1* | 9/2014 | Jeong | H02H 3/08 |
| | | | 361/87 |
| 2015/0041164 A1* | 2/2015 | Sergyeyenko | B25B 21/008 |
| | | | 173/1 |
| 2015/0375865 A1* | 12/2015 | Fischer | B60N 2/919 |
| | | | 701/49 |
| 2016/0084893 A1* | 3/2016 | Gubba Ravikumar | |
| | | | G01R 21/00 |
| | | | 702/60 |

OTHER PUBLICATIONS

Intersil Data Sheet, "6-Phase PWM Controller with Light Load Efficiency Enhancement and Current Monitoring," May 28, 2009, pp. 1-31.

\* cited by examiner

ADJUSTING OVER CURRENT PROTECTION VALUES DURING CHANGES IN LOAD CURRENT

CROSS-REFERENCE TO RELATED APPLICATIONS

This application is a continuation application of, and claims priority to, U.S. patent application Ser. No. 14/532,702, titled "ADJUSTING OVER CURRENT PROTECTION VALUES DURING CHANGES IN LOAD CURRENT," filed on Nov. 4, 2014. The disclosure of the foregoing application is incorporated herein by reference in its entirety for all purposes.

BACKGROUND

Electronic devices often require voltage regulators and power delivery networks that can provide low voltage at a high current. Furthermore, the power delivery network should be able to provide a reliable source of power over a range of load current frequencies and amplitudes.

Various protection systems are used to protect electronic devices, including voltage and current protection devices. Examples of the former include voltage surge and sag protectors, and examples of the latter include over current and under current protectors.

SUMMARY

This specification relates to an over current protection mechanism for a power delivery network and voltage regulators. In general, one innovative aspect of the subject matter described in this specification can be embodied in a method that includes the actions of monitoring a load current amplitude value at a power input connected to an electrical load; determining a rate of change of the load current amplitude value; determining whether the rate of change of the load current amplitude value exceeds a predefined rate threshold value; in response to determining that the rate of change of the load current amplitude value exceeds the predefined rate threshold value: adjusting an over current protection value from a first over current protection value to an adjusted over current protection value for a first predefined amount of time; and at the expiration of the first predefined amount of time, at least partially reversing the adjustment to the over current protection value; wherein the over current protection value is a value that causes a protection circuit to electrically isolate the electrical load from the power input when a current amplitude exceeds the over current protection value.

In general, another innovative aspect of the subject matter described in this specification can be embodied in a power monitoring system that includes a current detection device to: monitor a load current amplitude value at a power input connected to an electrical load; and determine a rate of change of the load current amplitude value; a data processing apparatus operatively configured to: determine whether the rate of change of the load current amplitude value exceeds a predefined rate threshold value; in response to a determination that the rate of change of the load current amplitude value exceeds the predefined rate threshold value: adjust an over current protection value from a first over current protection value to an adjusted over current protection value for a first predefined amount of time; and at the expiration of the first predefined amount of time, at least partially reverse the adjustment to the over current protection value; wherein the over current protection value is a value that causes the electrical load to be electrically isolated from the power input when a current amplitude exceeds the over current protection value.

Particular embodiments of the subject matter described in this specification can be implemented so as to realize one or more of the following advantages. Accurate and efficient assessment of power delivery quality, and voltage regulators, can be obtained at various load current amplitudes and frequencies. Particular implementations of the subject matter also allow for efficient operation of various electrical load devices. Particular implementations of the subject matter also allow for accurate adjustment of over current protection parameters without using a dedicated current measuring device. Particular implementations of the subject matter enable protection schemes for protecting various system devices according to electrical parameters rather than the thermal parameters of electrical equipment. Finally, the systems and methods enable full and complete operation of FPGA and other load devices during various (subtle and drastic) voltage and current transitions. In turn, this leads to reducing false trips during higher than normal load current draws. By modulating over current protection parameters, the systems and methods avoid false alarm over current events.

The details of one or more embodiments of the subject matter described in this specification are set forth in the accompanying drawings and the description below. Other features, aspects and advantages of the subject matter will become apparent from the description, the drawings and the claims.

DETAILED DESCRIPTION

The systems and methods described below facilitate dynamically adjustable over current protection parameters for an electrical load coupled to power distribution network and a power supply device. By utilizing adjustable over current protection parameters, the system can provide adequate over current protection parameters to ensure proper operation of the electrical load and the power supply device during transient current events. In particular, the present systems and methods temporarily adjusts the over current protection levels during high rate of changes in current loading to negate false trips that may be attributed to high di/dt events.

In some implementations, dynamically varying over current protection parameters enables consistent operation of the electrical load as the load current draw of the electrical load modulates according to the various operational functions of the electrical load. A high rate of change (di/dt) in load current may cause false trips or false alarms for the power supply device, power delivery network, and the electrical load. Adjusting the over current protection parameters during the such high di/dt rates of change alleviates false trips and alarms.

These features and additional features are described in more detail below.

Figure 1:
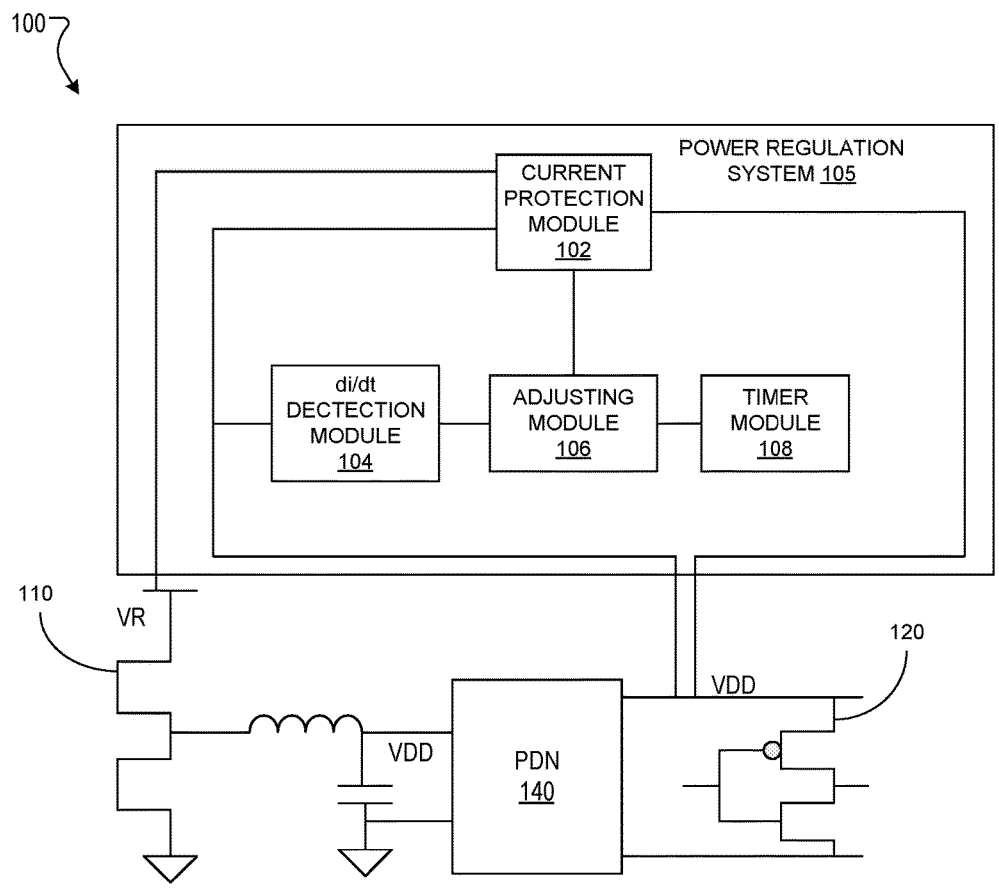
FIG. 1 is a block diagram of an example power regulation system for a power system.

FIG. 1 is a block diagram of an example power regulation system 105 for a power system 100. The power regulation system 105 is coupled to a power supply that provides power to a power delivery network 140 and an electrical load 120. In the examples that follow, the power supply is a voltage regulator 110 and the electrical load is a FPGA 120. The power supply and electrical load, however, may comprise any type of power source and/or electrical load.

In some implementations, the power regulation system 105 is operatively coupled to the VDD supply rail, as shown in FIG. 1. The power regulation system 105 monitors the load current amplitude value and the rate of change (di/dt) of the load current value to ensure safe and reliable operating conditions of the system 100. Although the example load current is described in the context of a DC system, the features may also be applied an alternating current (AC) and system that utilizes AC to power the various components within the system. The power regulation system 105 comprises a current protection module 102, a di/dt detection module 104, an adjusting module 106, and a timer module 108. In operation, the power monitoring system electrically isolates the electrical load 120 from the power input or the voltage regulator 110.

The current protection module 102 monitors the current amplitude value to the power delivery network 140 and, if the current amplitude exceeds an over current protection value, isolates the electrical load from power delivery network 140. The over current protection value is set to one of two values—a first over current protection value and an adjusted over current protection value that is higher than the first over current protection value. The over current protection value is normally set to the first over current protection value. When the di/dt detection module 104 detects a high di/dt in the load current, however, the over current protection value is adjusted from the first over current protection value to the adjusted over current protection value for a predefined amount of time. In either situation, when the current amplitude value of the load current exceeds the over current protection value, the current protection module 102 electrically isolates the load 120 from the power delivery network 140.

In some implementations, the over current protection values are instantaneous over current protection values. An instantaneous over current protection value defines the over current protection value that is exceeded by the load current amplitude value causing the protection circuit to electrically isolate the electrical load from the power input.

A variety of appropriate isolation techniques may be used. In some implementations, the current protection module 102 sends instruction to the voltage regulator 110 to cease operation. In other implementations, the current protection module 102 may operate a breaker device and opens the circuit between the voltage regulator 110 to the electrical load 120.

The di/dt detection module 104 monitors the rate of change of the current amplitude to detect load current changes that exceed a threshold di/dt value. These load current changes may be due to increased load demands and voltage transitions in response to voltage identification (VID) transitions. In some implementations, the di/dt detection module 104 comprises an adaptive phase alignment mechanism. An adaptive phase alignment mechanism provides additional current output as determined by the electrical load and can detect a di/dt value. For example, as a large current draw is demanded by the electrical load, the adaptive phase alignment mechanism will align the phases of the voltage regulator 110 to deliver a larger amount of current as demanded by the electrical load. In some other implementations, the di/dt detection module is a stand-alone device that detects rates of change of electrical current. A variety of di/dt detection circuitry and methods can be used.

The power regulation system 105 also includes an adjusting module 106 that receives the di/dt value from the di/dt detection module 104 and compares the received di/dt value to a threshold di/dt value. When the received di/dt value exceeds the threshold di/dt value, the adjusting module 106 transmits instructions to the current protection module 102 to adjust the over current protection value from the first over current protection value to the adjusted over current protection value for a predefined time period.

As the adjusting module 106 temporarily raises the over current value, a timer module 108 monitors the time that the over current value is adjusted. After a predefined amount of time has passed, the adjusting module 106 sends instructions to the current protection module 102 to restore the over current protection value to the first over current protection value.

Upon detection of a di/dt value that exceeds the threshold di/dt value, the adjusting module 106 may send an instruction to initiate or start the timer module 108. Accordingly, the timer module 108 begins to monitor and track time for a predefined amount of time, and at the expiration of the predefined amount of time, the timer module 108 returns an instruction to the adjusting module 106 identifying that the predefined amount of time has lapsed. Subsequently, the adjusting module 106 sends further instruction to the current protection module 102 to return the adjusted over current protection value to the first over current protection value.

The power regulation system 105 may be implemented as a stand-alone system with integrated current protection module 102, di/dt detection module 104, adjusting module 106, and timer module 108. The di/dt detection module, adjusting module, current protection module, and timer module may be implemented by any combination of integrated and stand-alone modules to construct the power regulation system 105.

Figure 2:
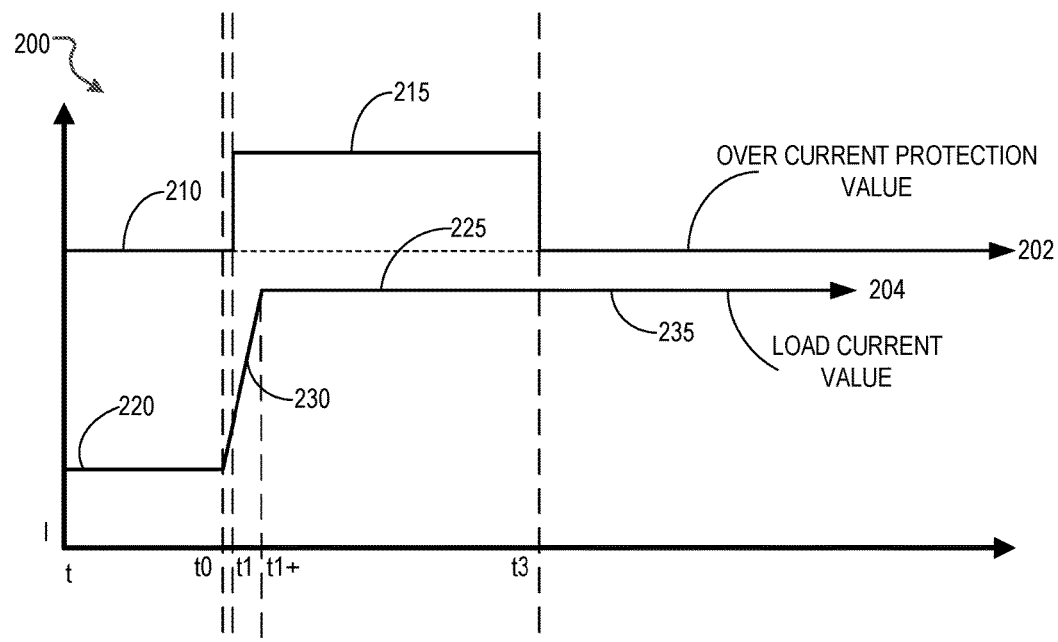
FIG. 2 is an illustration of an example profile of a load current amplitude waveform and an over current protection value.

FIG. 2 is an illustration of an example profile 200 of a load current amplitude waveform and an over current protection value. The current amplitude can be specified, for example, using an RMS value, or a peak value. Line 202 represents the over current protection value selected by the power regulation system 105, and line 204 represents the load current value over time. The profile 200 illustrates a high rate of change of the load current causing the system 105 to adjust the over current protection value from the first value 210 to the second value 215. In particular, the profile 200 illustrates operations of the system 100 during normal load operations, a transition to a high current draw operation, and then a return to normal operations.

As shown in FIG. 2, the load current amplitude value 220 is trending as a steady state amplitude value as time (i.e., the x-axis) approaches t1. Additionally, the current protection module 102 has selected the first over current protection value 210.

At time t0 an electrical load, such as a FPGA, performs operations that require a significant increase in the amount of current, and shown at t0 the rate of change of the current begins to increase.

At t1, the di/dt detection module 104 determines that the rate of change exceeds the di/dt rate threshold value rate of change 230 and initiates an adjustment of the over current protection value to the second value 215. The adjustment is for a first predefined period of time, e.g., until time t3. In some implementations, the first predefined time period for the adjustment is 50 μs. In some implementations, the first predefined time period begins at the detection of the di/dt value in the load current exceeding the rate threshold value, e.g. at time t1. In other implementations, the first predefined time period begins at the trailing edge of the di/dt change, e.g., at the time when the di/dt value falls below the rate threshold change, such as at the time t1+.

Raising the over current protection value higher than the first over current protection value 210 reduces the likelihood of a "false trip" that may result from a high di/dt change. As shown in FIG. 2, the peak current value 225 does not exceeded the first over current protection value 210. Had the over current protection value not been adjusted, however, the power regulation system 105 may have tripped the load 120.

In FIG. 2, the over current protection value is adjusted prior to the current amplitude reaching the first over current protection value. Conversely, the adjusting of the over current protection value to the adjusted over current protection value may occur after the current amplitude value exceeds the first over current protection value when there is a high di/dt detected.

At t3, the timer module 108 determines that the predefined time of 50 μs has expired and signals the adjusting module 106 of the expiration of the predefined amount of time. Accordingly, the adjusting module 106 sends an instruction to the current protection module 102 to end the over current protection value modulation and the over current protection value is returned to the first over current protection value 210.

The peak current value 225 remains as the adjusted steady state load current draw 235 for the particular FPGA operation. As shown, the adjusted steady state current draw 235 remains lower than the first over current protection value 210 after the over current protection value is returned to the first over current protection value. Although the load current value never exceeds the first over current protection value 210, the large di/dt may cause a false over current event. Accordingly, a false over current protection event is prevented by modulating the over current protection value during the large di/dt. Thus, the large di/dt does not cause a false over current protection event.

As shown in FIG. 2, the actual peak current value does not necessarily have to exceed the first over current protection value to necessitate the temporary modulation of the over current protection value. However, in FIG. 3, the peak current value does exceed the first over current protection value during the temporary adjustment of the over current protection value.

Figure 3:
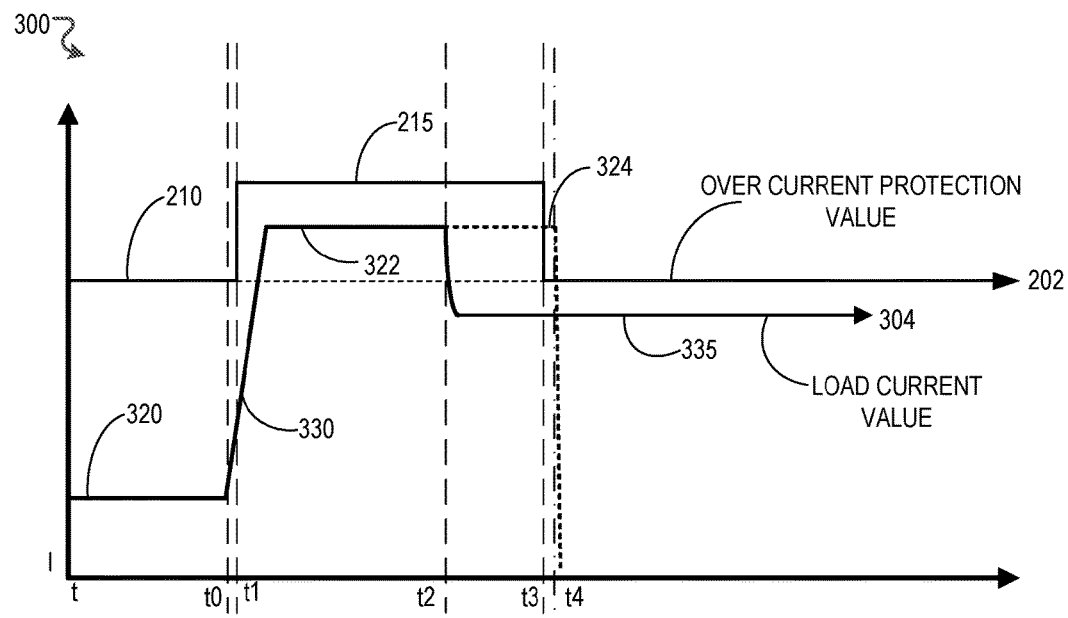
FIG. 3 is an illustration of an example profile of a load current amplitude waveform and an over current protection value.

In FIG. 3, line 202 again represents the over current protection value selected by the power regulation system 105, and line 304 represents another load current value over time. In FIG. 3, the load current value transitions to a high current draw scenario where the peak current value exceeds the first over current protection value 210, and then a return to normal operations.

The peak current value may exceed the first over current protection value 310 as long as the duration of excess does not go beyond the predefined time period ending at time t3. This accommodates relative short amplitude spikes and current transients that are of short enough duration to not damage the load. The duration may be dependent on thermal stress constraints of the load, and on current capacity of the power delivery network and voltage regulator.

As illustrated by the load current waveform 304, the current level increased to a peak level 322 that is greater than the first over current protection value 210. However, the level 322 is less than the adjusted over current value 215, and the first load current decreases below the first over current protection value 210 before the over current protection value is reduced back to the value 210. Thus, the power monitoring device 104 does not isolate the load 120 during the time period from t1 to t3. The current waveform 304 level decreases to a higher steady state amplitude 335. Although, the higher steady state amplitude 335 is greater than the original steady state amplitude 320, it is still lower than the original over current protection value 310, thereby the higher steady state amplitude does not cause a false over current event or a justified over current event.

In a second scenario, the second current waveform 304 level did not decrease after reaching a peak amplitude 322, as indicated by the dashed line 324. At time t3, which is the expiration of the predefined time period, the adjusting module 106 changes the over current protection value from the adjusted value 214 to the first value 210. As a result, the load current level 322 now exceeds the over current protection level 210. Thus, at time t4, the current protection module 102 isolates the load 120, resulting in the load current going to 0.

The duration and value of the over current protection threshold is selected such that the electrical constant, which is a value proportional to the over current value and the time period of adjustment is less than that of the thermal constant, which is a value proportional to temperature and duration that, when exceeded, may result in thermal damage. Thus, if after the expiration of the first predefined amount of time, the amplitude of the current draw still exceeds the first over current protection value, the load is isolated to prevent thermal damage.

Figure 4:
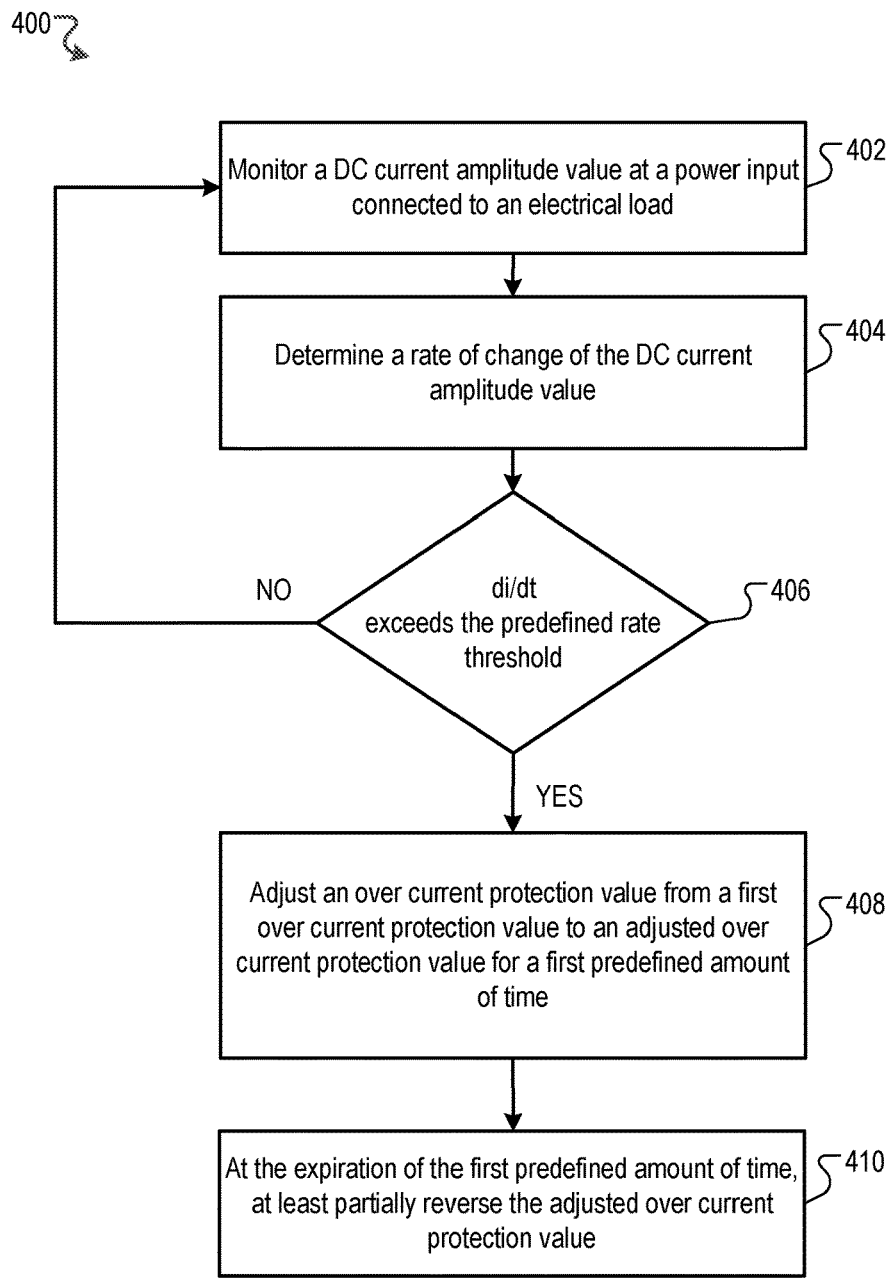
FIG. 4 is a flow chart of an example process of adjusting an over current protection value due to the rate of change of a load current amplitude value.

FIG. 4 is a flow chart of an example process of adjusting an over current protection value due to the rate of change of a load current amplitude value. The power regulation system 105 monitors a load current amplitude value at a power input connected to an electrical load (402). For example, as the voltage regulator 110 provides a normal steady state current amplitude value to the power delivery network 140 and the load 120, the power regulation system 105 monitors the load current amplitude value at a power input connected to the electrical load (402).

Further, the power regulation system 105 determines a rate of change of the load current amplitude value (404). For example, the di/dt detection module 104 determines the rate of change.

In some implementations, the power regulation system 105 determines whether the rate of change of the load current amplitude value exceeds a predefined rate threshold (406). In some implementations, the predefined threshold rate is determined to ensure small variations in the rate of change of the current amplitude is allowed and eliminates unnecessary adjustments of the over current protection value. The threshold rate can be determined from empirical analysis of a protection system, as particular protection systems may have different false positive di/dt rates.

If the rate of change of the load current amplitude value does not exceed the predefined rate threshold, the power regulation system 105 returns to step 402. Otherwise, if the rate of change of the load current amplitude value does exceed the predefined rate threshold, then the power regulation system 105 adjusts an over current protection value from a first over current protection value to an adjusted over current protection value for a first predefined amount of time (408). For example, the current protection module 102 adjusts the over current protection value to an adjusted over current protection value that is 40% greater than the first over current protection value for 50 μs. Other adjustment values and time periods can also be used.

At the expiration of the first predefined amount of time, the power regulation system 105 at least partially reverses adjustment to the over current protection value (410). In some implementations, the power monitoring system adjusts the over current protection value from the adjusted over current protection value to the first over current protection value. In other implementations, the power regulation system 105 adjusts the over current protection value from the first over current protection value to a different over current protection value that is lower than the adjusted over current protection value, but can be higher or lower than the first over current protection value.

Embodiments of the subject matter and the operations described in this specification can be implemented in digital electronic circuitry, or in computer software, firmware, or hardware, including the structures disclosed in this specification and their structural equivalents, or in combinations of one or more of them. The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
   determining that a rate of change of a current amplitude of a current exceeds a predefined rate threshold value and in response:
   adjusting an over current protection value from a first over current protection value to an adjusted over current protection value for a first predefined amount of time; and
   at an expiration of the first predefined amount of time, at least partially reversing the adjustment to the over current protection value;
   wherein the over current protection value is a value that causes a protection circuit to isolate an electrical load from a source of the current when the current amplitude exceeds the over current protection value.

2. The method of claim 1, wherein adjusting the over current protection value to the adjusted over current protection value comprises raising the over current protection value to a predefined higher over current protection value.

3. The method of claim 1, wherein adjusting the over current protection value from the first over current protection value to the adjusted over current protection value for the predefined amount of time comprises adjusting an instantaneous over current protection value that defines an over current protection value that, when exceeded by the current amplitude, causes the protection circuit to electrically isolate the electrical load from a power input.

4. The method of claim 1, wherein the first predefined amount of time begins when the rate of change of the current amplitude value exceeding the predefined rate threshold value is determined.

5. The method of claim 1, wherein adjusting the over current protection value to the adjusted over current protection value occurs prior to the current amplitude value exceeding the first over current protection value.

6. The method of claim 1, wherein at least partially reversing the adjustment to the over current protection value comprises adjusting over current protection value from the adjusted over current protection value to the first over current protection value.

7. The method of claim 1, wherein upon adjusting an over current protection value from a first over current protection value to an adjusted over current protection value, a timer is started to make a determination of a lapse of the predefined amount of time.

8. A power monitoring system, comprising:
   a current detection device to:
      determine that a rate of change of a current amplitude of a current exceeds a predefined rate threshold value and in response:
      adjust an over current protection value from a first over current protection value to an adjusted over current protection value for a first predefined amount of time; and
      at an expiration of the first predefined amount of time, at least partially reverse the adjustment to the over current protection value;
      wherein the over current protection value is a value that causes a protection circuit to isolate an electrical load from a source of the current when the current amplitude exceeds the over current protection value.

9. The system of claim 8, wherein the current detection device comprises an adaptive phase alignment device.

10. The system of claim 8, wherein adjust an over current protection value from a first over current protection value to an adjusted over current protection value comprises raising the first over current protection value to a higher predetermined over current protection value.

11. The system of claim 8, further comprising a voltage regulator for supplying the current amplitude value.

12. The system of claim 8, wherein adjusting the over current protection value from the first over current protection value to the adjusted over current protection value for the predefined amount of time comprises adjusting an instantaneous over current protection value that defines an over current protection value that, when exceeded by the current amplitude value, causes the protection circuit to electrically isolate the electrical load from a power input.

13. The system of claim 8, wherein the first predefined amount of time begins when the rate of change of the current amplitude value exceeding the predefined rate threshold value is determined.

14. The system of claim 8, wherein at least partially reversing the adjustment to the over current protection value comprises adjusting the over current protection value from the adjusted over current protection value to the first over current protection value.

15. The system of claim 8, wherein adjusting the over current protection value to the adjusted over current protection value occurs prior to the current amplitude value exceeding the first over current protection value.

16. The system of claim 8, wherein upon adjusting an over current protection value from a first over current protection value to an adjusted over current protection value a timer is started such that the power monitoring system determines a lapse of the first predefined amount of time.

\* \* \* \* \*